Dec. 3, 1957 — R. NEUSCHOTZ — 2,815,058
SPLIT SLEEVE TYPE LOCKING INSERT WITH INWARDLY DEFORMED THREAD AND LONGITUDINAL KEY
Filed Oct. 19, 1953
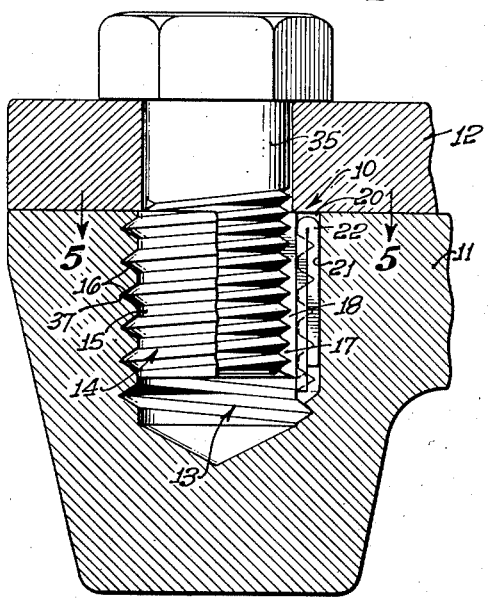
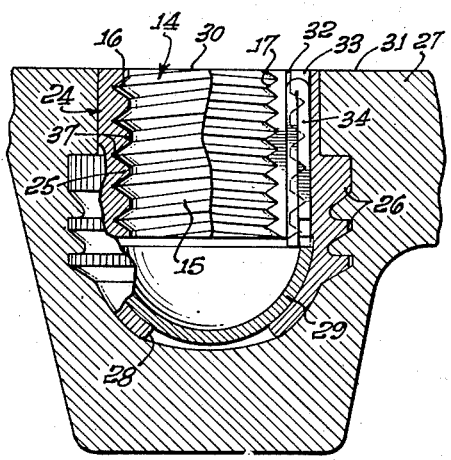
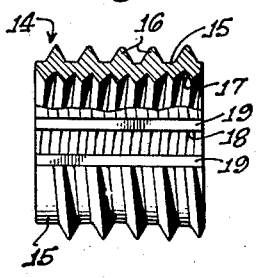
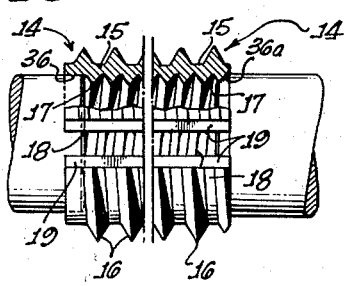
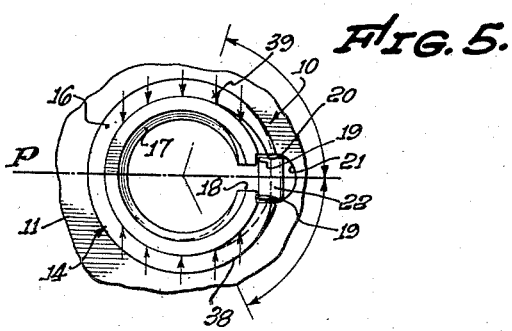
ROBERT NEUSCHOTZ,
INVENTOR.
BY
ATTORNEY

United States Patent Office 2,815,058
Patented Dec. 3, 1957

2,815,058

SPLIT SLEEVE TYPE LOCKING INSERT WITH INWARDLY DEFORMED THREAD AND LONGITUDINAL KEY

Robert Neuschotz, Los Angeles, Calif.

Application October 19, 1953, Serial No. 386,868

12 Claims. (Cl. 151—8)

This invention has to do with improvements in screw threaded insert fasteners, i. e. of the type comprising a nut element which may or may not be removable, adapted to be inserted directly within the work material or metal, or within a receptacle imbedded in the work material, or within a nut shell, the nut being internally adapted, as by threading, for reception of a bolt or other fastener element. More particularly, the invention is directed to improvements in what may be referred to as a sleeve type locking nut insert, and to the accomplishment of various objects realized by and in conjunction with the sleeve form of the nut.

The present invention has in common with the developments disclosed in my copending application Ser. No. 345,187, filed March 27, 1953, now Patent No. 2,742,938, issued April 4, 1956, on "Lock Nut Construction," the general concept of a lock nut in sleeve or relatively thin wall tubular form, internally threaded for reception of the bolt, and externally threaded for accommodation within a threaded body, e. g. an insert receptacle, the sleeve being split longitudinally along one side to form a way for reception of a key. The nut disclosed in the aforesaid application is given locking relation to the contained bolt by reason of transverse gripping contraction of the nut against the bolt as a result of an axial camming displacement of the nut threads along and with relation to the threaded bore of the body containing the nut.

One of the primary objects of the present invention is to impart to the sleeve nut improved self-locking characteristics by reason of a preformed condition of the nut, as distinguished from a deformed or displaced condition resulting for example from a camming contraction against external threads. In general, the present invention contemplates rendering the nut self-locking as a result of its tapered or swaged condition, the effect of which is to permit free turning entry of the bolt into the nut, and thereafter effecting a binding and frictional locking engagement of the bolt by reason of a progressive taper given the nut sleeve toward its longitudinal center. The present taper or swage given the nut is to be distinguished from a taper extending entirely or substantially the full length of the nut, as to which experience has shown that when the bolt is screwed into the sleeve throughout a greater portion of the sleeve length, the frictional bind developed may become so great as to score excessively either or both the bolt and nut, and frequently to the extent of removing from the bolt plating essential to its corrosion resistance. With the nut formed with a continuous full length taper in the same direction, the bolt could of course be turned into only one end of the nut.

In accordance with the invention I have devised a sleeve nut so formed as to permit insertion and free turning entry of the bolt into either end of the nut (the latter thus being reversible), and have accomplished highly effective locking action of the sleeve against the bolt by swaging the sleeve from both ends toward and preferably approximately to its longitudinal center. In swaging the sleeve its wall is so deformed both internally and externally, thus forming as viewed in cross-section essentially an arch having its bearing points against the body within which it is inserted, at or adjacent the ends of the sleeve. Accordingly, in being screwed into the sleeve, the bolt meets turning resistance by reason not only of the tapered configuration of the sleeve but also its arched condition, and the point of minimum constriction presented by the sleeve is at an intermediate point therein between end supporting locations, as distinguished for example from a situation where a nut tapered throughout its full length has a point of maximum restriction (and incidentally scoring tendency) at or adjacent one end. As disclosed in my copending application Ser. No. 386,869, now Patent No. 2,791,787, entitled "Method of Forming Tubular Locking Inserts," and filed on even date herewith, the sleeve nut may be given its swaged and opposite taper form by internally supporting the sleeve at its ends and applying swaging pressure externally to opposed longitudinally central locations on the sleeve. More specifically, and as will later appear, the swaging forces preferably are applied to the external surface of the sleeve in directions generally normal to the radial plane of the key way split in the sleeve.

A further object of the invention, and one related particularly to the split form of the nut sleeve, is to so form the key way or split in relation to the nut external threads as to assure exact registration of the way with a companion way formed in the body (work material or receptacle) receiving the nut, when the nut is inserted either end first to a predetermined point, usually to a depth such that the outerend of the nut is exactly flush with, or at an accurately predetermined distance from the surface of the work material or receptacle. This feature and object of the invention is of importance in insuring exact registration of the key ways without troublesome or painstaking manipulations on the part of the operator in that the registration is established simply by virtue of arrival of the nut at say a flush condition with the work material surface, as may be simply established by the engagement of a nut inserting tool with that surface. Briefly, this object is accomplished by forming the key way in the nut as a longitudinal open or straight through split located angularly midway between the thread terminals at opposite ends of the nut, the result being that the angular location of the split will be established at a definite point and consequently a registering key way may be preformed in the work material or receptacle at that same angular point.

All the features and objects of the invention, as well as the details of certain typical and illustrative embodiments, will be understood more fully from the following detailed description of the accompanying drawing, in which:

Fig. 1 is a view showing the nut turned into a threaded bore in one section of the work and receiving a bolt which secures a second work part;

Fig. 2 is a sectional view showing a variational form of the invention in which the sleeve nut is received within a preformed receptacle imbedded in the work material;

Fig. 3 is a view showing the nut in longitudinal cross-section;

Fig. 4 is a similar view illustrating a variational form of the nut;

Fig. 4a illustrates a further variation; and

Fig. 5 is a plan view taken on line 5—5 of Fig. 1.

Referring first to the form of the invention shown in Fig. 1, the fastener assembly generally indicated at 10, is shown to releasably secure together work members 11 and 12, the former of which may be assumed to consist of a metallic casting. The work section 11 is shown to contain a bore 13 threaded throughout its length or at least to a depth sufficient for full reception of the nut 14, the threads being of any suitable type or form and being shown essentially as V-threads having flattened crests.

The nut generally indicated at 14 has the form of a relatively thin wall metallic sleeve 15 carrying external screw threads 16 of the type, form and pitch corresponding to the work bore threads. The nut sleeve also has internal threads 17 which may be of similar type though having in most instances smaller size and lesser pitch and lead than the external threads 16. As best illustrated in Fig. 5, one side of the nut has a straight through longitudinal split 18 shouldered at 19 and forming a way 20 registering with a preformed way 21 in the work material for reception of a key 22. Referring to Fig. 1, the key 22 is shown to have the form of a small elongated flat metal strip doubled upon itself and having sufficient resiliency for frictional retention within the way.

The variational form of the invention illustrated in Fig. 2 shows the sleeve nut 14 to be received within a hollow receptacle 24 containing internal threads 25 corresponding to the external threads of the nut, and having peripheral flanges 26 to assure retention of the receptacle in the work metal or other material 27 within which the receptacle is cast. The receptacle shell has a bottom opening 28 closed by a generally hemispherical insert 29. When fully inserted into the receptacle so that its top surface 30 is flush with the work material surface 31, the key way 32 in the nut is brought into registry with way 33 in the receptacle, the nut being held against turning by key 34.

Referring now to Fig. 3 and the particular shape characteristics of the nut, the latter is shown to be tapered or swaged longitudinally from its ends to its center, the degree of taper being just sufficient to assure tight frictional retention of a bolt 35 screwed into the sleeve as in Fig. 1. As illustrative, assuming the nut to be made about ⅜ inch long of steel with a thickness of approximately .03 inch between the roots of the internal and external threads 16 and 17, and an internal thread root diameter of .213 inch at the ends of the sleeve, the taper or swage given the sleeve may be such as to reduce its internal root diameter at the longitudinal center of the sleeve to about .200 inch. In swaging the sleeve, external pressure is applied to its outer top and bottom surfaces (as viewed in Fig. 5) and at locations and in directions as indicated by the arrows, so that the results of the swaging forces are generally normal to the radial plane P of the key way 18. Thus if viewed in magnified cross-section, the sleeve would appear slightly elliptical at its longitudinal center, the long axis of the ellipse being in the plane P. As disclosed in my copending method application referred to above, the sleeve is swaged while being internally supported at its ends, as by tools given a turn or two into the threaded ends of the Fig. 3 form. Alternately, the sleeve may be terminally supported by unthreaded tools inserted within counterbores 36 in the form of the nuts shown in Fig. 4, or countersinks 36a in the Fig. 4a form, both of these embodiments being in all other respects the same as the Fig. 3 form.

A further effect of the swaging is to spring the inner thread ends adjacent the key way split outwardly from their initial true circular curvature, to an extent obviating any tendency for the thread ends to score the surface of the bolt.

Referring again to Figs. 1 and 2, when the nut is screwed into the work metal or receptacle to an outer end flush relation therewith, the swaged opposite taper of the nut causes slight external clearances to exist at 37 between the nut and work metal or receptacle threads, the clearance progressing from practically zero at the ends of the nut to a maximum at its longitudinal center. Thus as viewed in cross-section, the nut has a slightly arched engagement and relation with the receiving bore. The internal diameter of the nut at its ends is such as to permit free turning entry of the bolt 35. As the bolt is turned further into the nut, however, the nut taper imposes a binding and locking engagement with the bolt which effectively prevents its accidental turning out of the nut.

Referring again to Fig. 5, points 38 and 39 designate respectively the starts of the external thread 16 respectively at the upper and lower ends of the nut. The relative locations of these terminals may of course vary. The key way or split 18 is formed angularly midway between points 38 and 39. Thus when the nut is turned to a predetermined depth in the work metal or receptacle, say to a point at which the outer end of the nut and work material receptacle surfaces are flush, the key way 18 will always arrive at the same angular position about the nut and work bore axis. Accordingly, the angular position of the key way may be predetermined (as in accordance with the method disclosed in my copending application Serial No. 386,869, now Patent No. 2,791,787 entitled "Method of Forming Tubular Locking Inserts"), and preformed in the work metal or receptacle as the case may be, with assurance that when inserted to the predetermined depth in the work, the nut will have its way 18 in exact registration with the way 21.

In further relation to the key way 20, it is to be noted that as viewed in cross-section the way has decreasing transverse dimension toward the bore of the sleeve, specifically by virtue of the shoulder formation at 19. In this manner the key 22 is confined outwardly and against contact with the bolt 35.

The invention contemplates such initial formation of the nut sleeve 14 in relation to the bolt, and subsequent accommodation of the nut in the threaded work bore, as to permit predetermination of the bolt turning torque which will be caused by the nut, say in the condition of the parts shown in Fig. 1. By selection of material, size and swaged curvature of the nut sleeve in relation to the bolt, the sleeve may be designed to present resistance to turning of a bolt fully screwed into it, at any particular torque value within a substantial range. By sizing the maximum outside diameter of the sleeve in relation to the threaded work bore diameter, the nut may be accommodated in the work with sufficient clearance or looseness as to enable the nut sleeve to have substantially the same torque relation to the bolt as it would have if removed from the work.

I claim:

1. A nut insert comprising a tubular sleeve externally threaded to be removably turnable into a threaded bore and internally threaded to receive a bolt within either end, the wall of said sleeve containing a straight longitudinal split and being swaged progressively radially inward from opposite ends toward the longitudinal center of the sleeve to form a longitudinally arched sleeve portion extending between said ends and to provide external supports at said ends engageable with said bore to mount said arched portion in inwardly offset relation thereto, said portion permitting relative free axial turning entry of the bolt into either end of the sleeve and thereafter causing increasing resistance to turning entry of the bolt, said sleeve having a substantially elliptical C-shaped cross section in a plane extending normal to the sleeve axis and through said center.

2. A fastener comprising a nut including a tubular sleeve containing a single longitudinal through split, said sleeve being externally threaded to be removably turnable into a threaded bore and internally threaded to receive a bolt within either end, the sides of the sleeve opposite the radial plane of the split being swaged progressively radially inward toward that plane from the ends of the sleeve to substantially the longitudinally center thereof to form opposite and longitudinally arched sleeve portions extending between said ends and to provide external supports at said ends engageable with said bore to mount said arched portions in inwardly offset relation thereto, said portions permitting relatively free axial turning entry of the bolt into either end of the sleeve and thereafter causing increasing resistance to turning entry of the bolt, the terminal extents of the sleeve thread crests adjacent the split having radii of curvature being offset from the axial center of the sleeve to curve outwardly from the surface of the bolt threads said sleeve having a substantially elliptical C-shaped cross section in a plane extending normal to the sleeve axis and through said center, with the long axis of the ellipse extending in said split.

3. A fastener as defined in claim 2, in which the sleeve has external threads of greater pitch than the internal threads.

4. A fastener as defined in claim 2, including also a threaded bolt screwed into said sleeve, said terminal extents of the sleeve threads having greater radii of curvature than the bolt threads.

5. A nut insert comprising a tubular sleeve having an external screw thread for removable turning into a threaded bore and an internal screw thread running between end portions of the sleeve and interrupted by a straight through longitudinal key way split in the sleeve, the wall of said sleeve being swaged progressively radially inward from opposite ends toward the longitudinal center of the sleeve to form a longitudinally arched sleeve portion extending between said ends and to provide external supports at said ends engageable with said bore to mount said arched portion in inwardly offset relation thereto, said portion permitting relatively free axial turning entry of the bolt into either end of the sleeve and thereafter causing increasing resistance to turning entry of the bolt, said split being located angularly midway between the thread terminals at opposite ends of the sleeve, said sleeve having a substantially elliptical C-shaped cross section in a plane extending normal to the sleeve axis and through said center, with the long axis of the ellipse extending in said split.

6. An insert as defined in claim 5, in which the sleeve has external screw threads of greater pitch than the internal threads.

7. An insert as defined in claim 5, in which the terminal extents of the thread crests adjacent the split have radii of curvature greater than the radial distance from the axial center of the sleeve to corresponding thread crests at 90° from the center of the split.

8. The combination comprising a body containing a bore, a sleeve contained within the bore and threaded internally for reception of a bolt within either end, said sleeve having a longitudinal straight through split, a key inserted within a longitudinal way in the bore wall and the sleeve split, a bolt screwed into the sleeve, the wall of the sleeve being swaged progressively radially inward from opposite ends toward the center of the sleeve to form a longitudinally arched sleeve portion extending between said ends and to provide external supports at said ends engaged against said bore and mounting said arched portion in offset relation thereto, said portion permitting relatively free axial entry of the bolt into the end of the sleeve and thereafter causing increasing resistance to turning entry of the bolt, expansion of the sleeve upon such entry of the bolt being resisted by the longitudinally arched form of the sleeve wall due to its swaged deformation said sleeve having a substantially elliptical C-shaped cross section in a plane extending normal to the sleeve axis and through said center.

9. The combination as claimed in claim 8, in which the bore wall and sleeve exterior are threaded.

10. The combination as claimed in claim 8, in which the sleeve has external threads running from end to end of the sleeve and screwed into threads formed on the bore wall, the sleeve having a longitudinal straight through split located angularly midway between the terminals of the external sleeve thread at opposite ends of the sleeve.

11. A nut insert comprising a tubular sleeve externally threaded to be removably turnable into a threaded bore and internally threaded to receive a bolt within either end, the wall of said sleeve being swaged progressively radially inward from opposite ends toward the longitudinal center of the sleeve to form a longitudinally arched sleeve portion extending between said ends and to provide external supports at said ends engageable with said bore to mount said arched portion in inwardly offset relation thereto, said portion permitting relatively free axial turning entry of the bolt into either end of the sleeve and thereafter causing increasing resistance to turning entry of the bolt, one side of said sleeve containing a longitudinal through split forming a key way the transverse dimensions of which are reduced inwardly toward the bore of the sleeve said sleeve having a substantially elliptical C-shaped cross section in a plane extending normal to the sleeve axis and through said center, with the long axis of the ellipse extending in said split.

12. A nut insert comprising a tubular sleeve externally threaded to be removably turnable into a threaded bore and internally threaded to receive a bolt within either end, the wall of said sleeve being swaged progressively radially inward from opposite ends toward the longitudinal center of the sleeve to form a longitudinally arched sleeve portion extending between said ends and to provide external supports at said ends engageable with said bore to mount said arched portion in inwardly offset relation thereto, said portion permitting relatively free axial turning entry of the bolt into either end of the sleeve and thereafter causing increasing resistance to turning entry of the bolt, one side of said sleeve containing a longitudinal through split forming a key way the sides of which are shaped to present opposed shoulders at which the transverse dimensions of the way are reduced toward the bore of the sleeve.

References Cited in the file of this patent

UNITED STATES PATENTS

| | | |
|---|---|---|
| 1,433,528 | Bryant et al. | Oct. 31, 1922 |
| 2,286,982 | Todd | June 16, 1942 |
| 2,363,663 | Findley | Nov. 28, 1944 |
| 2,400,348 | Greene | May 14, 1946 |
| 2,545,045 | Rosan | Mar. 13, 1951 |
| 2,742,938 | Neuschotz | Apr. 24, 1956 |